United States Patent [19]

Clark et al.

[11] Patent Number: 5,491,477
[45] Date of Patent: Feb. 13, 1996

[54] ANTI-ROTATION MECHANISM FOR DIRECT MANIPULATION POSITION INPUT CONTROLLER FOR COMPUTER

[75] Inventors: Michael R. Clark, Glendale; Alan C. Kay, Los Angeles; Thomas Ferrara, Canyon Country, all of Calif.

[73] Assignee: Apple Computer, Inc., Cupertino, Calif.

[21] Appl. No.: 120,678

[22] Filed: Sep. 13, 1993

[51] Int. Cl.⁶ .............................. G09G 1/00; G08C 21/00
[52] U.S. Cl. ........................... 341/20; 345/167; 345/163; 33/25.1; 178/18
[58] Field of Search .................... 341/20, 31, 35; 345/163, 164, 167, 168, 157, 158, 127; 273/438, 148.6; 74/471 XY; 33/23.01, 25.1

[56] References Cited

U.S. PATENT DOCUMENTS

| | | | |
|---|---|---|---|
| 4,444,997 | 4/1984 | Danish et al. | 178/18 |
| 4,550,316 | 10/1985 | Whetstone et al. | 340/710 |
| 4,561,183 | 12/1985 | Shores | 178/18 |
| 4,780,707 | 10/1988 | Selker | 340/710 |
| 4,868,549 | 9/1989 | Affinito et al. | 345/165 |
| 4,935,728 | 6/1990 | Kley | 341/31 |
| 5,132,672 | 7/1992 | Clark | 345/164 |
| 5,248,961 | 9/1993 | Fujii | 345/164 |

*Primary Examiner*—James J. Groody
*Assistant Examiner*—Glenton B. Burgess
*Attorney, Agent, or Firm*—Blakely, Sokoloff, Taylor & Zafman

[57] ABSTRACT

An apparatus for inputting and controlling the position of a pointer on a computer screen without permitting any rotation of the apparatus relative to the marker is described. The apparatus comprises a pantagraph device, namely a plate, connect by two arms to a gripable element, and by a separate two arms to a housing, the apparatus being coupled to a position sensing system such as a mouse ball or optical sensing system. This apparatus can be used for easily and accurately controlling a pointer for painting programs and the like.

18 Claims, 4 Drawing Sheets

ANTI-ROTATION MECHANISM FOR DIRECT MANIPULATION POSITION INPUT CONTROLLER FOR COMPUTER

BACKGROUND OF THE INVENTION

1. Field of the Invention

This invention relates to a device for controlling the position of objects on the display of a computer system, and more particularly, to an improved control device for manipulating such objects while preventing rotation which causes skewed movement of such objects.

2. Art Background

Standard control devices for manipulating the position of objects on the display screen of a computer system include cursor positioning keys, mouse systems, track balls and joy sticks. With a mouse, the movement of the mouse across a pad translates to the movement of a cursor or other object across the computer display screen in the same direction in most circumstances. Similarly, the rotation of a trackball, while remaining in place, creates an equivalent movement of a cursor, or the like, across the computer display screen.

Many computer users, being right handed or left handed, have a tendency or preference to angle their writing hand inward toward their body. Thus, depending upon the positioning of the trackball or mouse pad, a straight wrist position may be uncomfortable or awkward. However, this straight wrist position is essential for proper movement of the object across the screen. If the wrist is turned inward so that the mouse is not positioned perpendicular to it's x and y axes when in the mouse is not positioned perpendicular to it's x and y axes when in use, the cursor will travel in an angled or skewed movement across the screen. For example, if the cursor is turned 30° inward toward the user's body, and then the mouse is moved in a line parallel to the direction the user is facing, the cursor will move at an angle across the computer screen 30° from vertical.

For graphic artists who may use a computer to draw pictures and the like, the angling of the wrist may be important for the drawing techniques or styles which they use. For example, in using paint brushes, colored pencils, chalk or charcoal, sometimes the artist angles his or her wrist to create the desired brush stroke or the like. However, if the artist were to angle the wrist while using a prior art mouse, the line would not go where the mouse goes, but would go at an angle instead. Also, for all users, there is a natural tendency to curl inward the wrist toward the body, whether with the right or left hand.

There is a prior art device called a pantagraph which has been used in the graphics industry for a number of years to trace and enlarge a picture, drawing or the like. The device consists of a pointer which is coupled through a connector to a pen, where the coupling mechanism enable the enlargement of the image traced by the pointer. These pantagraph devices have not heretofore been adapted for any use on a computer system.

SUMMARY OF THE INVENTION

The present invention comprises a pantagraph-like device which couples a control knob to a computer system. The device detects the movement of the control knob and translates it to the computer system so that movement of the control knob causes a cursor or other object on a computer screen to move. The pantagraph-like device prevents the control knob from rotating, so that under all conditions, movement in the x and y planes causes equivalent movement of the object on the computer screen without any skewing. The invention maintains the true x and y plane movements by preventing rotation of the control knob relative to the movement sensing means. The device also permits fine control of the cursor or other computer screen object when there is limited movement of the cursor because the control mechanism can be "ratcheted" by picking it up off the surface, pulling it back and sliding it along the surface again.

In the preferred embodiment, the present invention comprises a plate with a border and a control knob disposed on the plate. The control knob is connected to any type of position sensing mechanisms including a linear, rotary or optical sensing mechanism, all of which are known in the art. As the control knob is moved, the cursor or other object on the screen is moved exactly the same (except for scale, if desired). This arrangement gives the user more precise control which is more normal for a typical user; that is, it works more like a pen, which obviates the requirement that a user become familiar and proficient with a trackball or mouse. Additionally, the control knob can be any useful shape, including a pen shape, which artists may find very comfortable. Furthermore, the entire device can be disposed within a small area, and therefore, can be used even with a portable computer having limited desk space.

The pantagraph-like coupling device has two sets of generally parallel arms, one set of arms being coupled at one end to the control knob or plate on which the control knob is fixed, and the other end of said first set of arms being coupled to a regular geometric plate, such as a square plate, with each one of the first set of arms being connected to an diagonally opposite corner of the square plate. The other set of arms is connected to an anchor means or other fixed position device at one end, and at the other end, each of the second set of arms is connected to the two remaining diagonally opposing corners of the regular geometric plate. If the regular geometric plate is a circle, then each set of arms is connected to said circular plate such that an imaginary line connecting the connection points of said arms to said plate passes through the center of the circular plate. The sensing device can either be disposed directly under the control knob, in which case, it may be directly connected to the control knob, or it can be disposed remote from the control knob.

These and other objects are addressed by the present invention, the drawings and details of which are described below.

DESCRIPTION OF THE INVENTION

Figure 1:
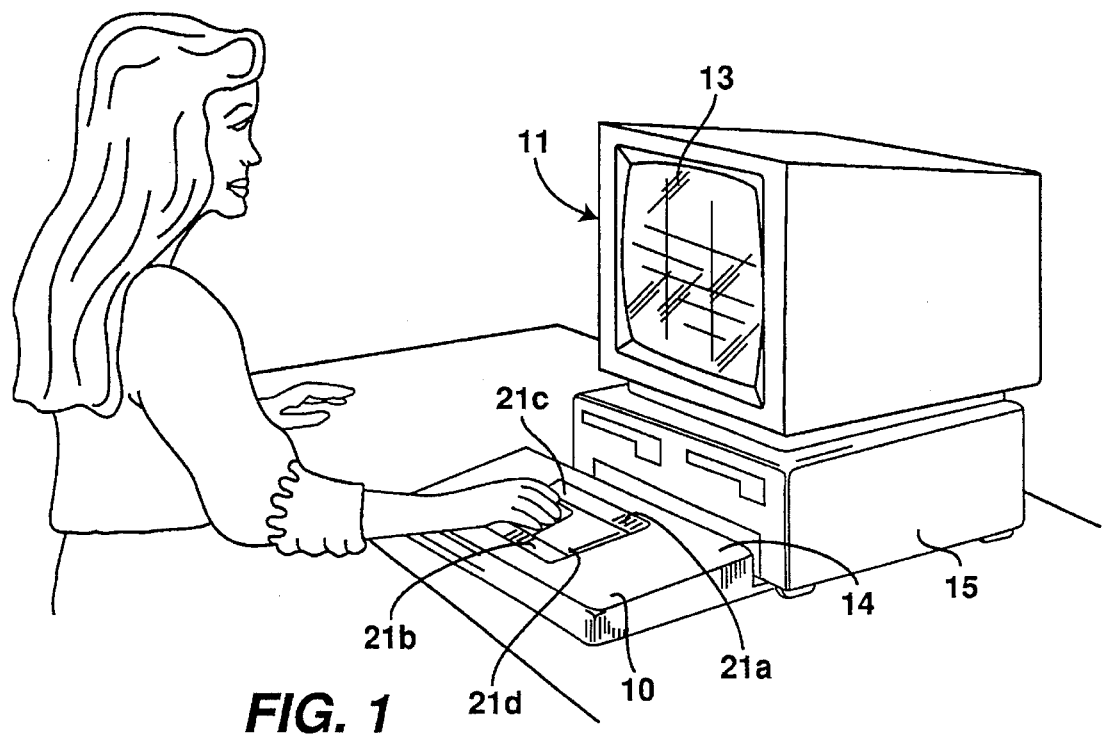
FIG. 1 is a side perspective illustration of one embodiment of the present invention being operated by a user.

The present invention as shown generally in FIG. 1 comprises an input device for a computer system for inputting the position of objects, such as a cursor or mark, on a computer screen. The computer is a conventional personal computer 11 or the equivalent and may comprise a video screen 13 and a computer housing 15, or any other arrangement well-known in the art. The device 10 can be made integral with a keyboard (not shown) of a computer in the same way that a track ball can be incorporated into a computer system. Alternatively, the device may be a separate stand-alone device.

Figure 2:
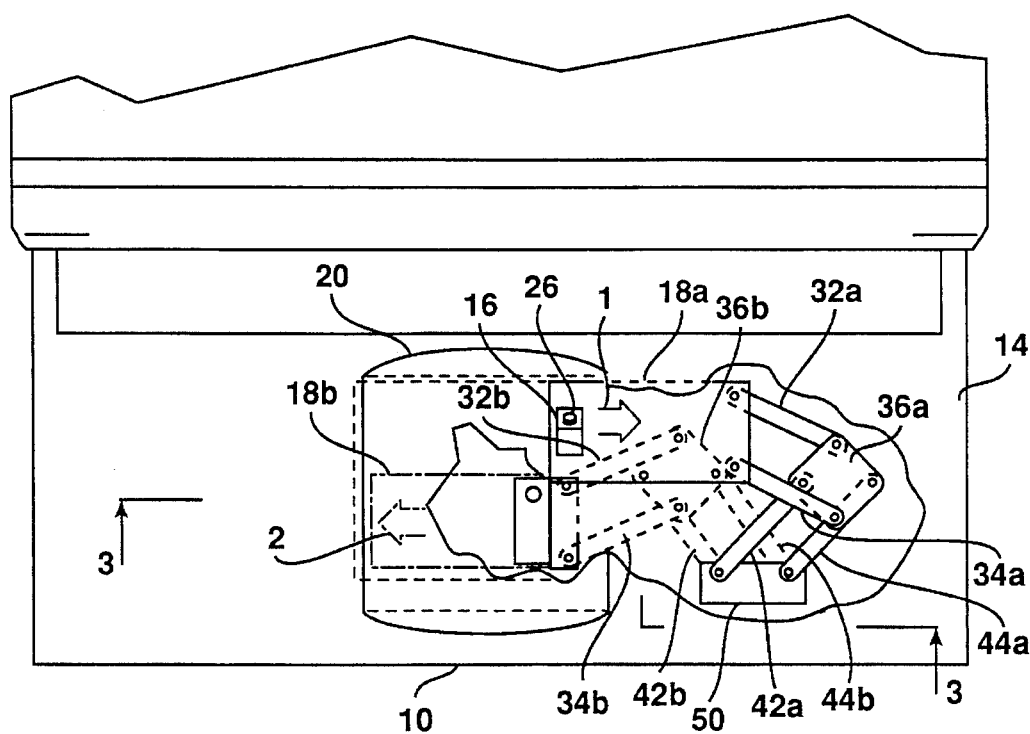
FIG. 2 is a top plan view of the anti-rotation device of the present invention in a partial cut-away view illustrating the operation of the invention in two positions.

As shown in FIG. 2, the input device 10 of the present invention is demonstrated in two different positions. FIG. 2 is a partially cutaway view of the input device of the present invention installed in a housing 14 which can be a special housing for a stand-alone version of the device or a portion of a keyboard for a more compact version of the device. When installed in a keyboard the device includes a control knob 16 with a button means 26, attached to a plate 18, the plate 18 being slidably attached to the interior of the housing 14, and a border 20 defining an area of slidable movement of the control knob 16. There is preferably some vertical play in slidable attachment of the plate 18 to the housing 14 so that the control knob 16 can be "ratcheted" to move the cursor other object on the display screen further along the display screen when the control knob 16 reaches the border 20, as described in more detail below. As illustrated in FIG. 1, the plate 18 is preferably sized so that no matter where the control knob is positioned within the border 20, the plate entirely covers the area within the border 20. This ensures that there is no gap, and keeps the area under the plate generally clean. The border 20 is defined by top border member 21a, bottom border member 21b, left side border member 21c and right side border member 21d.

In the first position of the plate 18 shown in FIG. 2, arrow 1 depicts the movement of the plate 18 from a center position to a far right position. In the second position of the plate 18 shown in FIG. 2, the movement of the plate 18 to a lower left position is shown. Each of these is described in more detail below, after the basic structure of the pantagraph attachment is described.

Figure 5:
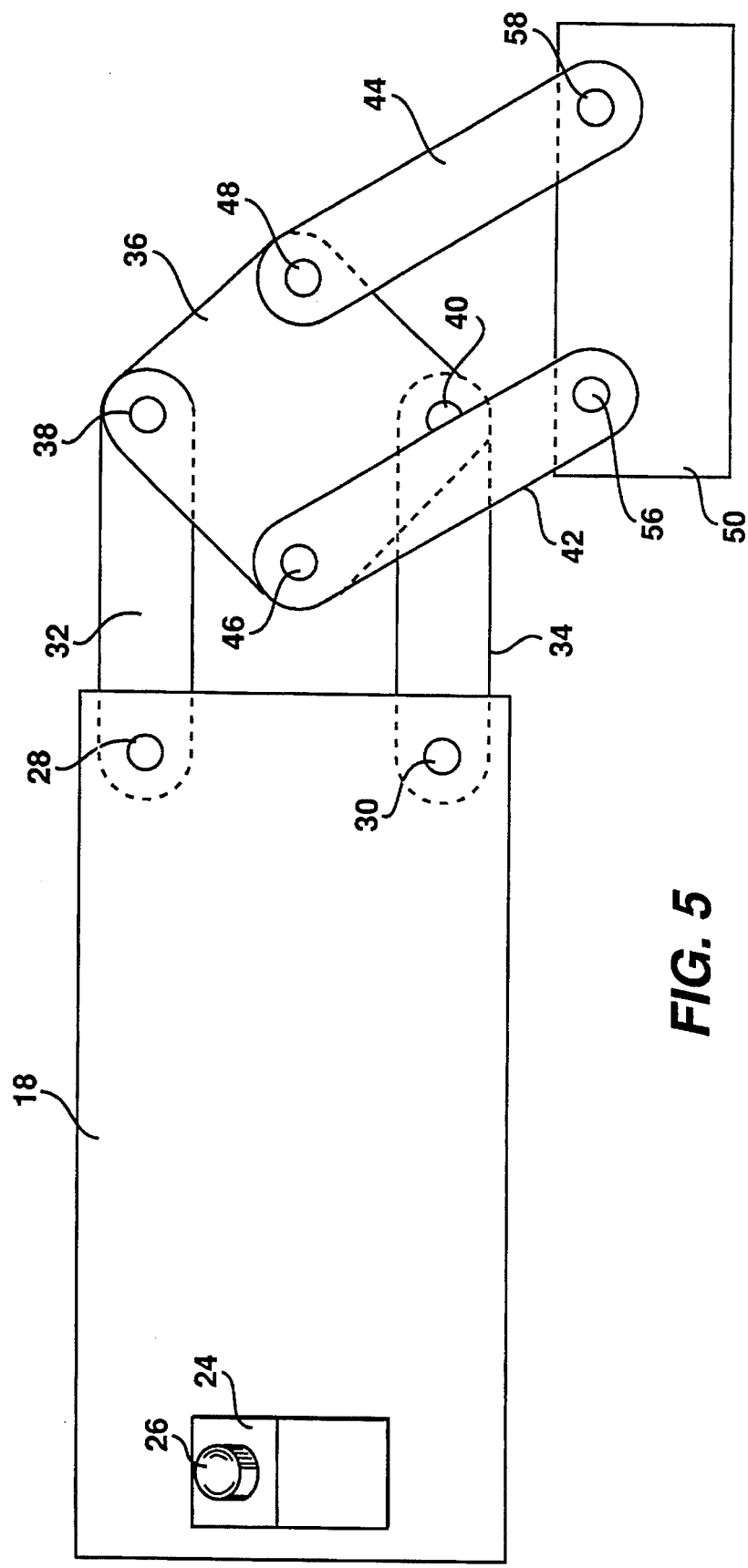
FIG. 5 is an enlarged top plan view of the embodiment of the present invention shown in FIG. 2.

As shown in FIG. 5, in the preferred embodiment, the control knob 16 comprises a body portion 24 and a button means 26. The body portion 24 can be any shape but is preferably a shape which is easy to grip. The button means can either be raised, flush or recessed in the body portion 24, and serves as a button as is typically found on a mouse, as is known in the art.

Also as shown in FIG. 5, the plate 18 is attached by two pivot means 28 and 30 to arms 32 and 34 respectively, which are attached on the underside of the plate 18. The opposite ends of arms 32 and 34 are attached to pantagraph plate 36, and specifically are attached at pivots 38 and 40 on diagonally opposing sides of pantagraph plate 36. Preferably the arms 32 and 34 are attached to pivots 38 and 40 on the underside of pantagraph plate 36. Arms 42 and 44 are attached to the remaining two corners of pantagraph plate 36 at pivots 46 and 48. The other ends of arms 42 and 44 are coupled at pivots 56 and 58, respectively, to mount 50 which is secured in position to the housing.

In FIG. 2, the plate 18a is attached to arms 32a and 34a respectively. The opposite ends of arms 32a and 34a are attached to pantagraph plate 36a. Arms 42a and 44a are attached to the remaining two corners of pantagraph plate 36a. The other ends of arms 42a and 44a are coupled to mount 50 which is secured in position to the housing. With reference to the second position of the invention shown in FIG. 2, the plate 18b is attached to arms 32b and 34b respectively. The opposite ends of arms 32b and 34b are attached to pantagraph plate 36b. Arms 42b and 44b are attached to the remaining two corners of pantagraph plate 36b. The other ends of arms 42a and 44a are coupled to mount 50 which is secured in position to the housing.

Figure 6:
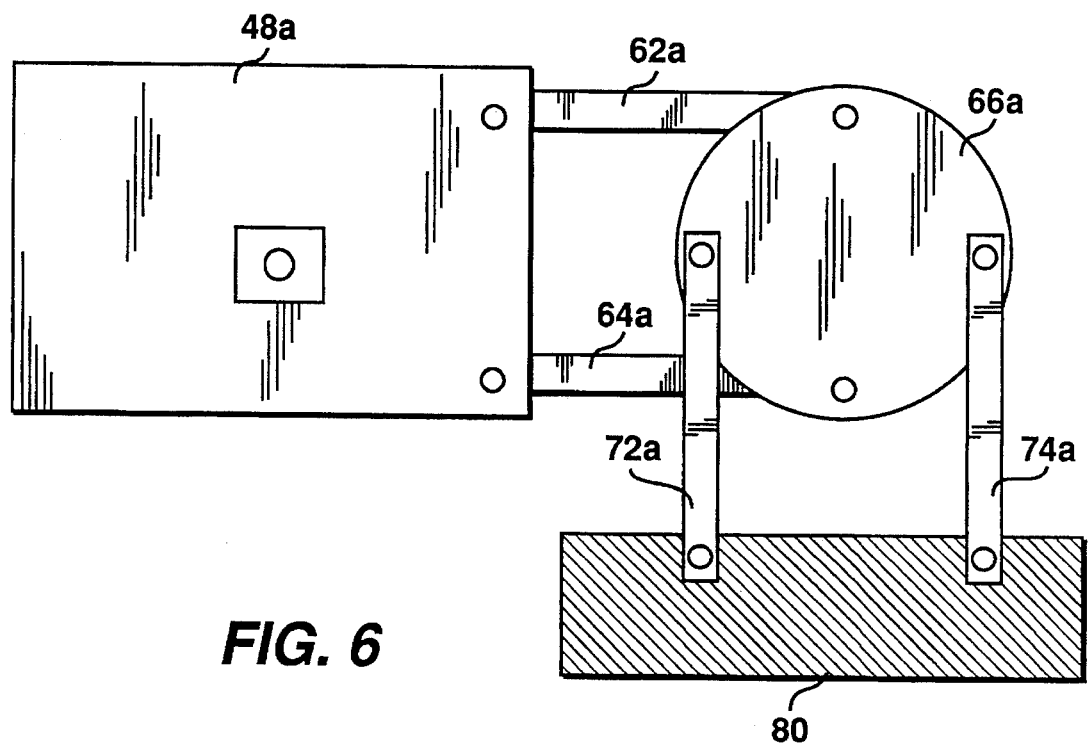
FIG. 6 is an enlarged top plan view of an alternative embodiment of the present invention.
Figure 7:
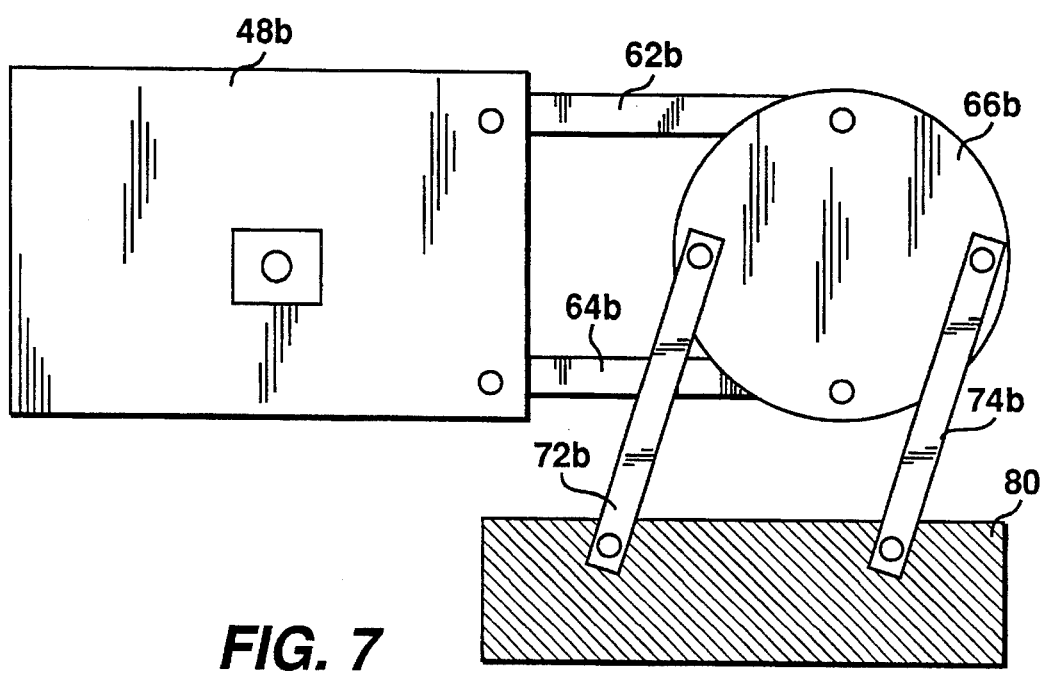
FIG. 7 is an enlarged top plan view of the embodiment of the present invention shown in FIG. 6 with the control knob in a different position.

The same effect is shown in FIGS. 6 and 7 which show another embodiment of the present invention in which the pantagraph plate 66a and 66b is round rather than rectangular. As shown in FIG. 6, the plate 48a is attached to arms 62a and 64a respectively. The opposite ends of arms 62a and 64a are attached to pantagraph plate 66a. Arms 72a and 74a are attached to the remaining two corners of pantagraph plate 66a. The other ends of arms 72a and 74a are coupled to mount 80 which is secured in position to the housing. As shown in FIG. 7, the plate 48b is attached to arms 62b and 64b respectively. The opposite ends of arms 62b and 64b are attached to pantagraph plate 66b. Arms 72b and 74b are attached to the remaining two corners of pantagraph plate 66b. The other ends of arms 72a and 74a are coupled to mount 80 which is secured in position to the housing.

Figure 3:
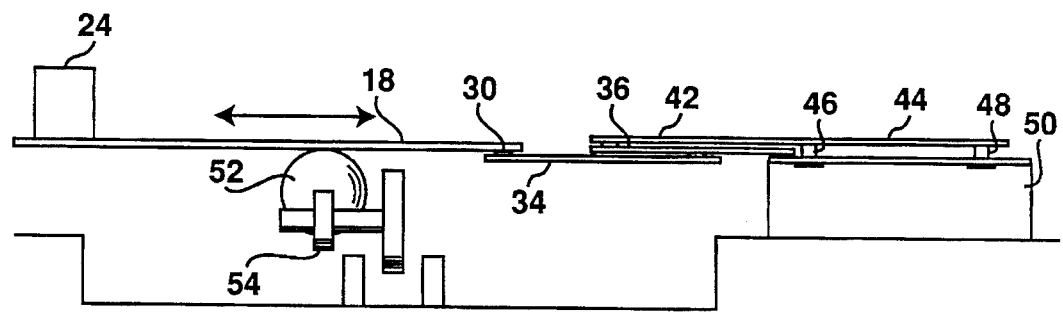
FIG. 3 is a side sectional view of the present invention taken through lines 2—2 of FIG. 2, and illustrating one type of position detection device which may be used in conjunction with the present invention.
Figure 4:
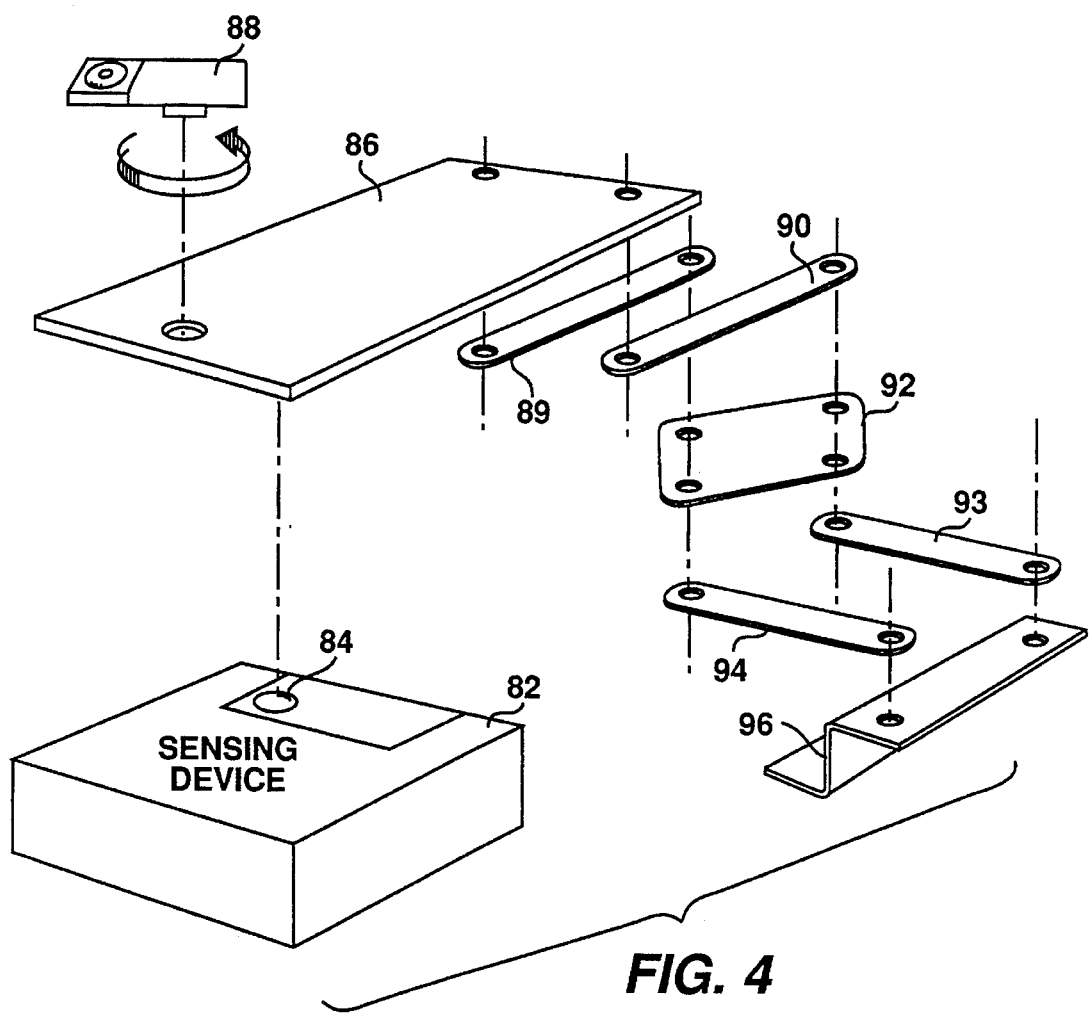
FIG. 4 is an exploded view of an alternative embodiment of the present invention which utilizes an optical sensing device for position detection.

FIGS. 3 and 4 show alternative position sensing devices. It will be appreciated by persons of skill in the art that any type of position sensing device may be utilized in the present invention without departing from the spirit and scope of the present invention. It is also beyond the scope of this application to describe, in detail, the operation of position sensing devices since such devices are well known in the prior art. The critical feature of the present invention is the association of a fixed position relative to the control knob with the position sensing device so that the movement of the control knob translates to a comparable movement of a cursor or other indicator on the computer screen.

FIG. 3 specifically depicts one embodiment where a mechanical mouse device is used to control the cursor movement. It will be obvious to any one skilled in the art that many modifications can be made to this structure without departing from the spirit and scope of the present invention. The plate 18 overlies and engages a ball 52 so that movement of the plate in any direction x, y or anywhere through the x–y axis causes a comparable rotation of the ball 52. Sitting below the ball is sensing wheel 54 which senses the rotation of the ball 52 in one direction, and a second sensing wheel (not shown), which senses rotation in a perpendicular direction. Such sensing devices are well known in the art. The ball 52 remains stationary relative to the plate, except for the rotation described above, so that any and all movement of the plate 18 translates precisely to the same mount of rotation of the ball 52. The plate 52 is held to move in the x and y planes by the arm 34 and the arm 32 (not shown) being attached to the plate 36, which in turn is attached to the housing by bracket 50 through arms 42 and 44.

In FIG. 4, which is an exploded view of another embodiment of the present invention, the position sensing device is optical rather than mechanical. Such devices are well known in the prior art, and operate on the principal of counting the number of grid lines or other markers which pass an optical eye. As shown in FIG. 4, the present invention comprises a sensing device 82 having an eye 84 for detecting the relative movement of the plate 86 relative to the eye 84, the sensing device being fixed in position relative to the computer. FIG. 4 also illustrates that the control knob 88 may be rotatably disposed in the plate 86. This facilitates use with either hand of a user for improved comfort without skewing the movement of the cursor on the computer screen. As shown above, and as with the other embodiments described herein, the plate 86 is connected to arms 89 and 90 which are connected on opposite sides to pantagraph plate 92, with the other two opposing sides of pantagraph plate 92 being connected to arms 93 and 94 which are attached to bracket 96.

It will be appreciated by persons of ordinary skill in the art that while the presently preferred embodiment has been shown herein with the position sensing apparatus being directly associated with the plate, such arrangement is not required, and the position sensing apparatus can be disposed in a position remote from the plate as long as the sensing apparatus is arranged to sense the relative movement of the plate to the system. On example of such arrangement may be an arm containing an optical eye being attached to the underside of the plate and a grid being disposed adjacent the eye in a remote portion of the device.

Additionally, it may be noted that the movement of the cursor or other screen pointer does not need to be linear with the movement of the control knob, and it may be scaled up or down depending upon whether fine or gross movements are required for the particular task being performed.

It will be obvious to a person of ordinary skill in the art that many changes and modifications can be made to the above-described system which will fall within the spirit and scope of the invention as set forth in the appended claims.

What is claimed is:

1. An apparatus for controlling the positioning of a pointer on a computer screen comprising:

a housing, a finger-gripable element mounted in the housing for moving generally in two directions within the housing, said housing comprising an area edge means for limiting movement of the finger gripable element, means for detecting movement of said finger gripable element and translating said movement into a signal interpretable by a computer for making a similar movement of a pointer on a computer screen, means for connecting said finger gripable element to said means for detecting movement, said connecting means comprising a pantagraph means having a first connecting means and a second connecting means, said pantagraph means connected by said first connecting means to said finger gripable element and connected by said second connecting means to said housing, whereby movement of said finger gripable element causes similar movement of said computer screen pointer without permitting any rotation of the finger gripable element relative to the computer screen pointer.

2. The apparatus of claim 1 wherein said pantagraph means comprises a plate, and said first and second connecting means each comprising a pair of parallel arms.

3. The apparatus of claim 2 wherein said pantagraph plate comprises a generally square plate two pair of diagonally opposing corners, and each arm of said pair of arms of said first connecting means is connected to said finger gripable element at one end thereof and to one of said diagonally opposing corners of said pantagraph plate at the other end, and each arm of said pair of arms of said second connecting means is connected to said housing at one end thereof and to one of said diagonally opposing corners of said pantagraph plate at the other end thereof.

4. The apparatus of claim 1 wherein said finger gripable element further comprises an activation key for providing a selection signal.

5. The apparatus of claim 1 wherein said finger gripable element is movable in a third direction to disengage said means for detecting movement, whereby said finger gripable element can be moved in said third direction and relocated to move the pointer on said computer screen to a position on said screen beyond an equivalent position with said area edge means.

6. The apparatus of claim 1 wherein said means for detecting movement comprises a ball engaging a plurality of wheels disposed in planes corresponding two to said two directions, said finger-gripable element further comprising a housing plate means and wherein said ball engages said housing plate means.

7. The apparatus of claim 1 wherein said means for detecting movement comprises an optical reader for detecting the position of said finger-gripable element.

8. The apparatus of claim 2 wherein said pantagraph plate comprises a generally circular plate and each arm of said pair of arms is connected at one end thereof to a point on said pantagraph plate radially across from the connection point of the other arm of said pair of arms.

9. A computer point system comprising:

computer means including a monitor having a two-dimensional display on which a marker can be generated and moved within a display area of movement;

a housing, a gripable element mounted in the housing for being gripped by a user and moved generally in two directions within said housing, said housing comprising an area edge means for limiting movement of the gripable element, means responsive to the movement of said gripable means for generating signals related to the movement of the gripable means for detecting movement of said finger gripable element and translating said movement into a signal interpretable by a computer for making a similar movement of a pointer on a computer screen, means for connecting said gripable element to said means for detecting movement, said connecting means comprising a pantagraph means having a first connecting means and a second connecting means, said pantagraph means connected by said first connecting means to said gripable element and connected by said second connecting means to said housing, whereby movement of said gripable element causes similar movement of said maker without permitting any rotation of the finger gripable element relative to the computer screen pointer.

10. An apparatus for controlling the positioning of a pointer on a computer screen comprising:

a housing, a gripable element mounted in said housing wherein said gripable element moves generally in two directions within said housing, said housing having a border to limit movement of said gripable element, a position sensing device that detects movement of said gripable element and translates said movement into a signal interpretable by said computer for making a similar movement of said pointer on said computer screen, a connecting device attaching said gripable element to said position sensing device such that movement of said gripable element causes similar movement of said pointer on said computer screen without permitting any rotation of said gripable element relative to said pointer on said computer screen, said connecting device comprising a pantagraph device having a first connecting element and a second connecting element wherein said pantagraph device is connected by said first connecting element to said gripable element and connected by said second connecting element to said housing.

11. The apparatus of claim 10 wherein said pantagraph device further comprises a pantagraph plate, said first and second connecting elements of said pantagraph device each comprising a pair of parallel arms.

12. The apparatus of claim 11 wherein said pantagraph plate comprises a generally square plate having two pairs of diagonally opposing corners wherein each arm of said pair of parallel arms of said first connecting element is connected to said gripable element at one end thereof and to one of said diagonally opposing corners of said pantagraph plate at the other end thereof and each arm of said pair of parallel arms of said second connecting element is connected to said housing at one end thereof and to one of said diagonally opposing corners of said pantagraph plate at the other end thereof.

13. The apparatus of claim 10 wherein said gripable element further comprises an activation key for providing a selection signal.

14. The apparatus of claim 10 wherein said gripable element is movable in a third direction to disengage said position sensing device such that said gripable element can be moved in said third direction and relocated to move said pointer on said computer screen to a position on said screen beyond an equivalent position with said boundary.

15. The apparatus of claim 10 wherein said position sensing device comprises a ball engaging a plurality of wheels disposed in planes corresponding to said two directions, said gripable element further comprising a housing plate wherein said ball engages said housing plate.

16. The apparatus of claim 10 wherein said position sensing device comprises an optical reader for detecting the position of said gripable element.

17. The apparatus of claim 11 wherein said pantagraph plate comprises a generally circular plate and each arm of said pair of said pair of arms is connected at one end thereof to a point on said pantagraph plate radially across from the connection point of the other arm of said pair of arms.

18. A computer system comprising:

a display device having a two-dimensional display on which a marker can be displayed and moved, a housing, a gripable element mounted in said housing such that said gripable element can be gripped by a user and moved generally in two directions within said housing, said housing having a boundary for limiting movement of said gripable element, a position sensing device that generates signals related to the movement of said gripable element, said position sensing device detects movement of said gripable element and translates said movement into a signal interpretable by a computer for making a similar movement of said marker on said display device, a connecting device attaching said gripable element to said position sensing device such that movement of said gripable element causes similar movement of said marker on said display device wherein any rotation of said gripable element relative to said marker on said display device does not cause a rotation of said marker, said connecting device comprising a pantagraph device having a first connecting element and a second connecting element wherein said pantagraph device is connected by said first connecting element to said gripable element and connected by said second connecting element to said housing.

\* \* \* \* \*